US010969970B2

(12) United States Patent
Hattori (10) Patent No.: US 10,969,970 B2
(45) Date of Patent: Apr. 6, 2021

(54) STORAGE OPTIMIZATION OF DATABASE IN VOLATILE AND NON-VOLATILE STORING UNIT (71) Applicants: KABUSHIKI KAISHA TOSHIBA, Tokyo (JP); TOSHIBA SOLUTIONS CORPORATION, Kawasaki (JP)

(72) Inventor: Masakazu Hattori, Inagi (JP)

(73) Assignees: Kabushiki Kaisha Toshiba, Tokyo (JP); Toshiba Solutions Corporation, Kawasaki (JP)

( * ) Notice: Subject to any disclaimer, the term of this patent is extended or adjusted under 35 U.S.C. 154(b) by 0 days.

(21) Appl. No.: 14/206,663

(22) Filed: Mar. 12, 2014

(65) Prior Publication Data
US 2015/0261454 A1    Sep. 17, 2015

Related U.S. Application Data (63) Continuation of application No. PCT/JP2013/055822, filed on Mar. 4, 2013.

(51) Int. Cl.
G06F 12/00 (2006.01)
G06F 3/06 (2006.01)
G06F 12/127 (2016.01)

(52) U.S. Cl.
CPC .......... G06F 3/0619 (2013.01); G06F 3/0647 (2013.01); G06F 3/0685 (2013.01); G06F 12/127 (2013.01)

(58) Field of Classification Search
CPC ..... G06F 3/0619; G06F 3/0647; G06F 3/0685
See application file for complete search history.

(56) References Cited

U.S. PATENT DOCUMENTS 5,408,644 A * 4/1995 Schneider ........... G06F 12/0804
711/E12.019
6,594,711 B1 * 7/2003 Anderson ........... G06F 12/0802
710/22

(Continued)

FOREIGN PATENT DOCUMENTS

CN    1708757 A    12/2005
JP    07-013824    1/1995

(Continued)

OTHER PUBLICATIONS

Notification of Reason(s) for Refusal issued by the Japanese Patent Office dated Dec. 9, 2014, for Japanese Patent Application No. 2014-504112, and English-language translation thereof.

(Continued)

Primary Examiner — Prasith Thammavong
Assistant Examiner — Eric T Loonan
(74) Attorney, Agent, or Firm — Finnegan, Henderson, Farabow, Garrett & Dunner, L.L.P.

(57) ABSTRACT

According to an embodiment, a database device includes a volatile first storing unit, a non-volatile second storing unit, an access processing unit configured to execute an operation corresponding to an access request for each of a plurality of blocks obtained by dividing data pieces, a backup processing unit configured to write data of each of the plurality of blocks at a backup time to the second storing unit, and a block management unit. The block management unit writes, under certain conditions, data of any block stored in the first storing unit to the second storing unit, and reads data of a block targeted by an access request from the second storing unit to the first storing unit. The backup processing unit writes data of a block that is not yet written to the second storing unit among the plurality of blocks.

11 Claims, 8 Drawing Sheets

(56) References Cited

U.S. PATENT DOCUMENTS

| | | | |
|---|---|---|---|
| 6,950,823 B2* | 9/2005 | Amiri | G06F 17/30457 707/690 |
| 2004/0133538 A1 | 7/2004 | Amiri et al. | |
| 2010/0036890 A1 | 2/2010 | Kawamura | |
| 2010/0138391 A1* | 6/2010 | Namikawa | G06F 17/30289 707/640 |

FOREIGN PATENT DOCUMENTS

| | | |
|---|---|---|
| JP | 2006-139696 | 6/2006 |
| JP | 2009-217688 | 9/2009 |
| JP | 2010-039819 | 2/2010 |
| JP | 2010-134522 | 6/2010 |
| JP | 2011-136532 | 9/2011 |
| JP | 2012-247901 | 12/2012 |

OTHER PUBLICATIONS

Okuno, "Let's start with the latest version 5.6! Introduction to practice of MySQL," WEB+DB Press, May 25, 2013, 74:82.

Shono, "mixi, niconico douga, livedoor: Learning memcached best practices from real-life examples," WEB+DB Press, Dec. 1, 2008, 47:62.

Hamamoto, "Connecting in Java," WEB+DB Press, Mar. 25, 2011, 61:119.

Patent Examination Report No. 1 issued by the Australian Patent Office dated Oct. 1, 2015, for Australian Patent Application No. 2013380500.

Written Opinion issued by the International Bureau of WIPO dated Jun. 4, 2013, for International Application No. PCT/JP2013/055822.

First Office Action dated Sep. 30, 2016, in corresponding Chinese Application No. 201380003041.X, and English translation 13 pages.

Extended European Search Report dated Oct. 31, 2016, in corresponding European Application No. 13834379.3, 7 pages.

* cited by examiner

|  | FINAL REFERENCE TIME | FINAL BACKUP TIME | DIRTY FLAG |
|---|---|---|---|
| FIRST TYPE BLOCK | NO REFERENCE FOR CERTAIN TIME | WRITING TO BACKUP FILE COMPLETED | 0 |
| SECOND TYPE BLOCK | NO REFERENCE FOR CERTAIN TIME | WRITING TO BACKUP FILE NOT COMPLETED | — |
| THIRD TYPE BLOCK | NO REFERENCE FOR CERTAIN TIME | WRITING TO BACKUP FILE COMPLETED | 1 |

STORAGE OPTIMIZATION OF DATABASE IN VOLATILE AND NON-VOLATILE STORING UNIT

CROSS-REFERENCE TO RELATED APPLICATIONS

This application is a continuation of PCT international application Ser. No. PCT/JP2013/055822 filed on Mar. 4, 2013 which designates the United States, the entire contents of which are incorporated herein by reference.

FIELD

Embodiments described herein relate generally to a database device, a computer program product and a data processing method.

BACKGROUND

An in-memory database is conventionally known. The in-memory database is a database that stores all or most of data pieces in a volatile memory. The in-memory database reduces access to a disk recording device and the like. Thus, a response to an access request can become faster.

The in-memory database periodically backs up a data image of data pieces to a disk recording device and the like. Accordingly, even if a trouble occurs and the data pieces stored in the volatile memory is lost, the in-memory database can recover data pieces to the time of backup.

The in-memory database also stores a log of update access in a disk memory device in some cases. In this case, the in-memory database reads data pieces at the time of backup and then re-executes the log to thereby completely recover the data pieces at the time when a trouble occurred in a computer.

Meanwhile, in the case when the size about data pieces exceeds the capacity of a volatile memory, the in-memory database needs to have a part of the data pieces stored in a disk memory device and the like. In such a case, the in-memory database comes to increase access to the disk memory device and the like. Especially, since the in-memory database periodically performs a backup of data pieces, a part of the data pieces comes to be redundantly recorded in a disk recording device, which is inefficient.

DETAILED DESCRIPTION

According to an embodiment, a database device includes a volatile first storing unit; a non-volatile second storing unit; an access processing unit configured to execute an operation corresponding to an access request for each of a plurality of blocks obtained by dividing data pieces; a backup processing unit configured to write data of each of the plurality of blocks at a backup time to the second storing unit; and a block management unit. The block management unit is configured to, when a block targeted by an access request is not stored in the first storing unit, and the first storing unit has a free space not larger than a predetermined amount, write data of any block stored in the first storing unit to the second storing unit, and read the data of the block targeted by the access request from the second storing unit to the first storing unit. The backup processing unit writes, sequentially for each block, data of each of the plurality of blocks at a predetermined first backup time to a first backup file in the second storing unit, on condition that the data is not yet written to the first backup file. The backup processing unit writes, sequentially for each block, data of each of the plurality of blocks at a second backup time after a predetermined time from the first backup time to a second backup file in the second storing unit, on condition that the data is not yet written to the second backup file. When an update request is made not before the first backup time and before the second backup time, and data of a block targeted by the update request is not yet written to the first backup file, the block management unit writes pre-update data of the block targeted by the update request to the first backup file.

Figure 1:
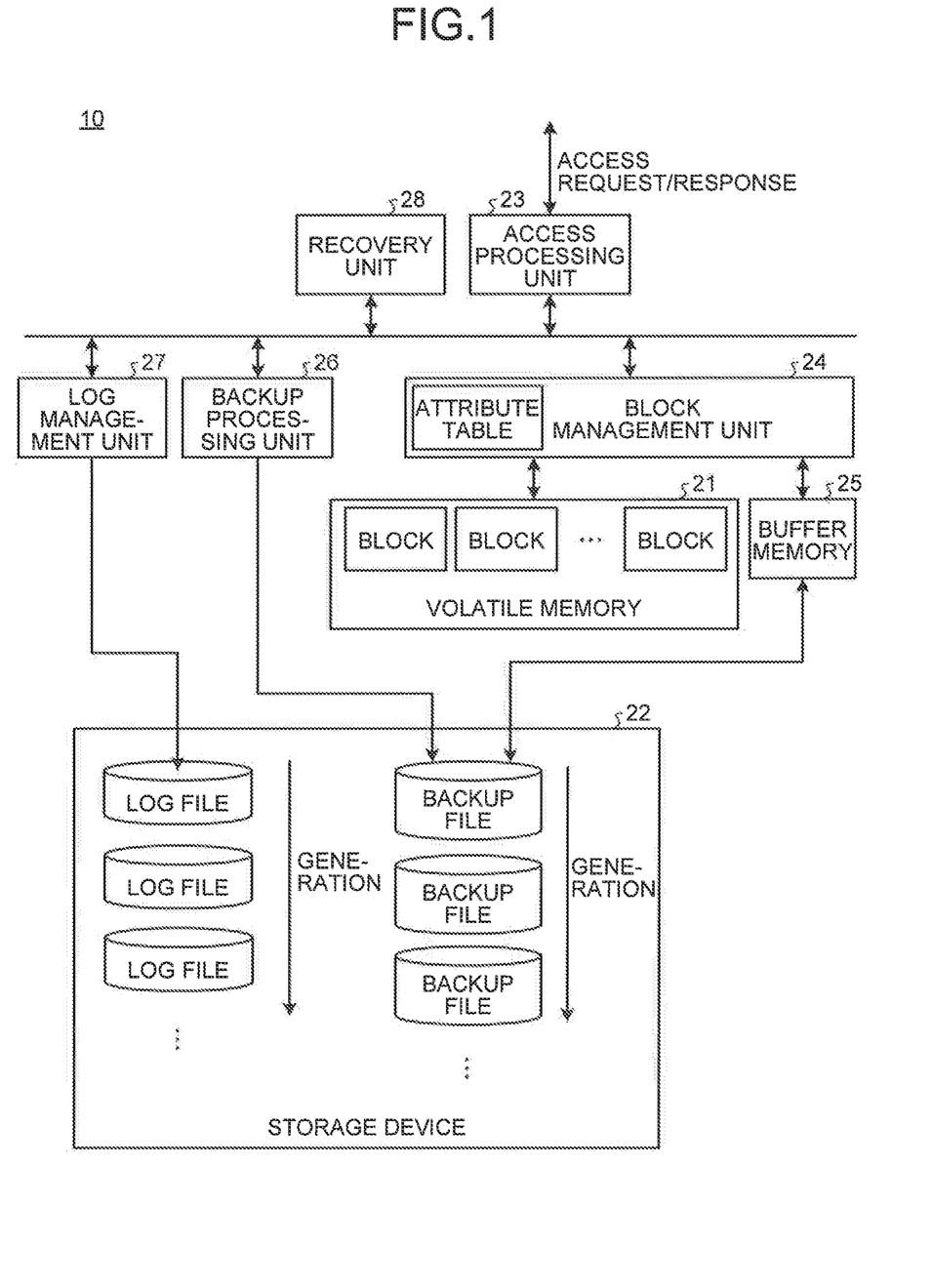
FIG. 1 is a diagram illustrating a functional structure of a database device according to an embodiment.

FIG. 1 is a diagram illustrating a functional structure of a database device 10 according to an embodiment. The database device 10 receives an access request (for example, reference or update) to data pieces contained in a database, from a client terminal, an application server and the like via a network. Then, the database device 10 executes operations corresponding to the received access request.

The database device 10 includes a volatile memory 21, a storage device 22, an access processing unit 23, a block management unit 24, a buffer memory 25, a backup processing unit 26, a log management unit 27, and a recovery unit 28. The access processing unit 23, the block management unit 24, the backup processing unit 26, the log management unit 27 and the recovery unit 28 are implemented by execution of a program by a computer. The access processing unit 23, the block management unit 24, the backup processing unit 26, the log management unit 27 and the recovery unit 28 may be partly or completely implemented by hardware.

The database device 10 manages data pieces contained in a database by dividing the data pieces into a plurality of blocks. Each of the plurality of blocks is stored in at least one of the volatile memory 21 and the storage device 22.

The volatile memory 21 is a memory device provided in a computer. The volatile memory 21 can store data while power is supplied, but the data disappears when the power supply is terminated. The storage device 22 writes and reads data while power is supplied, but the data does not disappear even when the power supply is terminated. The storage device 22 is, for example, a non-volatile memory device, such as a hard disk drive device, which is connected to an interior or exterior of a computer.

Furthermore, the storage device 22 stores data of each of the plurality of blocks at a backup time. The storage device 22 stores, as an example, a data image of each of the plurality of blocks. In this case, the backup time is set, for example, at each predetermined interval.

Here, the data of each of the plurality of blocks is written to a backup file in the storage device 22. The backup file is generated corresponding to each backup time.

The storage device 22 also stores a log indicating an update history of data pieces. The log may be a history of received access requests.

The log is written to a log file in the storage device 22. The log file is generated for each period between the backup time and the next backup time.

The access processing unit 23 executes operations corresponding to an access request to each of the plurality of blocks. As an example, when a reference request is received, the access processing unit 23 reads a target data stored in the volatile memory 21 from a block targeted by the reference request, and returns the read data. Further, when an update request is received, as an example, the access processing unit 23 updates a target data in a block targeted by the update request, which is stored in the volatile memory 21. Furthermore, when the update request is received, the access processing unit 23 sends to the log management unit 27 an order to write the log in the log file.

The block management unit 24 manages recording positions of the plurality of blocks, so that each of the plurality of blocks is stored in at least one of the volatile memory 21 and the storage device 22. Specifically, the block management unit 24 controls a recording position of each block, so that all of the plurality of blocks are stored in the volatile memory 21 as much as possible.

Figure 2:
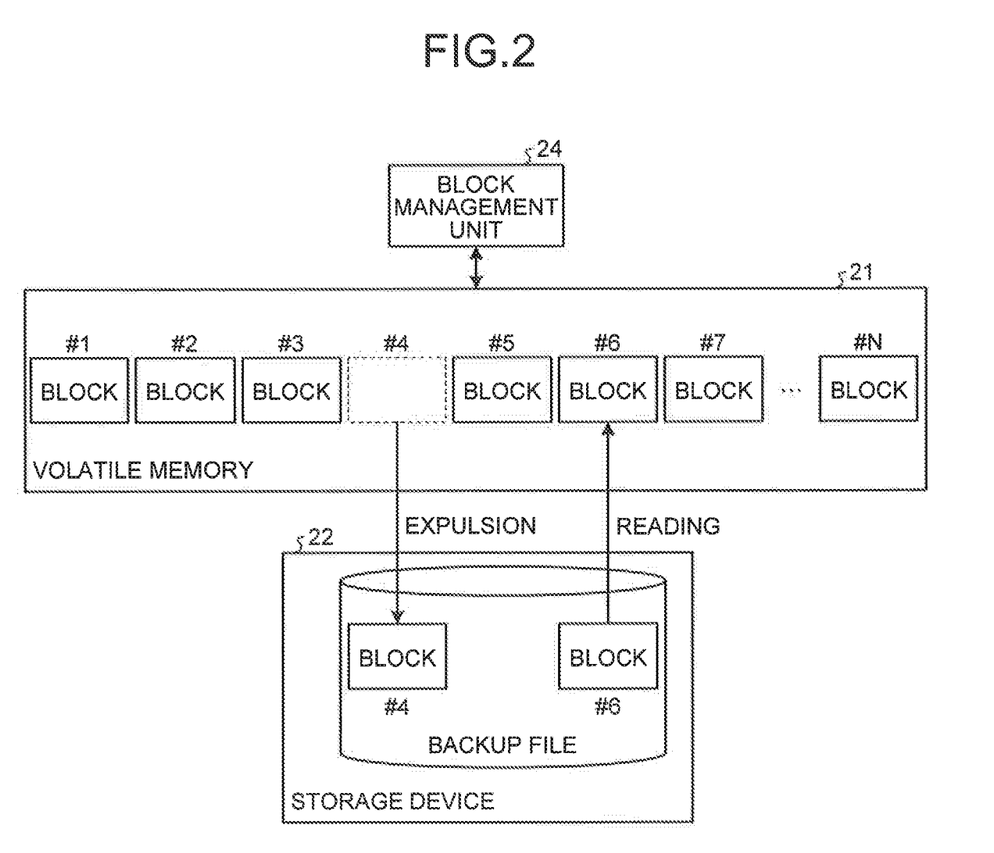
FIG. 2 is a diagram for explaining backup processing and log recording processing.

However, when all of the plurality of blocks cannot be stored in the volatile memory 21 (such as, when the volatile memory 21 has a capacity smaller than the whole data amount of the plurality of blocks), the block management unit 24 stores a part of the plurality of blocks in the storage device 22 as illustrated in FIG. 2.

Moreover, when a block targeted by an access request is not stored in the volatile memory 21, the block management unit 24 reads data of the block targeted by the access request from the storage device 22 to the volatile memory 21, on condition that the volatile memory 21 has free space larger than a predetermined amount. When the block targeted by the access request is not stored in the volatile memory 21, and the volatile memory 21 has free space not larger than the predetermined amount, the block management unit 24 writes data of any block stored in the volatile memory 21 to the storage device 22. Thereafter, the block management unit 24 reads the data of the block targeted by the access request from the storage device 22 to the volatile memory 21.

In this case, when writing the block to the storage device 22, the block management unit 24 writes the data to a backup file in the storage device 22. Furthermore, when the block management unit 24 receives an update request, and data of a block targeted by the update request is not yet written to a backup file, the block management unit 24 writes the pre-update block data to the backup file, and then allows the data to be updated.

Figure 3:
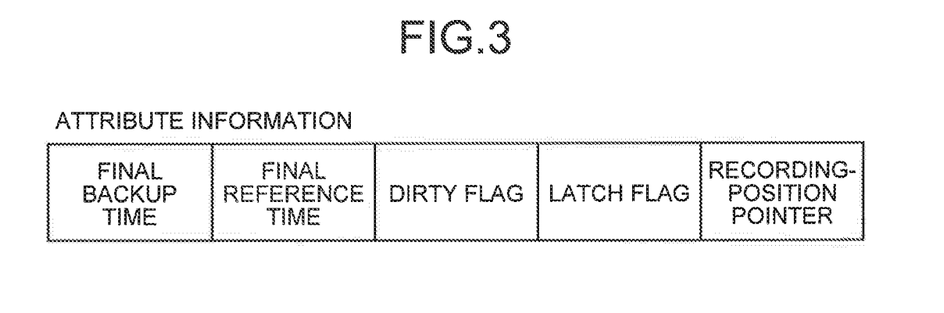
FIG. 3 is a diagram illustrating contents of attribute information.

The block management unit 24 manages attribute information as illustrated in FIG. 3 for each of the plurality of blocks. The attribute information contains a final backup time, a final reference time, a dirty flag, a latch flag, and a recording-position pointer.

The final backup time is a backup time when data was last written. The final reference time indicates a time when a reference request including an update request was last processed. The dirty flag indicates whether or not update was performed after data was last written. In the present example, the dirty flag is set to "1" when update was performed after data was last written, and set to "C" when update was not performed after data was last written.

The latch flag indicates whether or not update processing is being performed. In the present example, the latch flag is set to "1" when update processing is being performed, and "0" when update processing is not being performed. The recording-position pointer indicates a recording position (for example, an address) on the volatile memory 21 or the storage device 22 where a target block is recorded.

When the block management unit 24 evicts a block from the volatile memory 21 into the storage device 22, the buffer memory 25 temporarily stores the block stored in the volatile memory 21. Accordingly, the buffer memory 25 can generate a free space on the volatile memory 21 for reading a block from the storage device 22 to the volatile memory 21 in a short time.

The backup processing unit 26 executes backup processing for the plurality of blocks. Specifically, the backup processing unit 26 writes data of each of the plurality of blocks at a backup time to a backup file in the storage device 22. In this case, the backup processing unit 26 writes data of a block that is not yet written to the storage device 22 among the plurality of blocks. For example, the backup processing unit 26 selects and writes, sequentially for each block, data of a corresponding block at a backup time, on condition that the data is not yet written to the backup file in the storage device 22.

Figure 4:
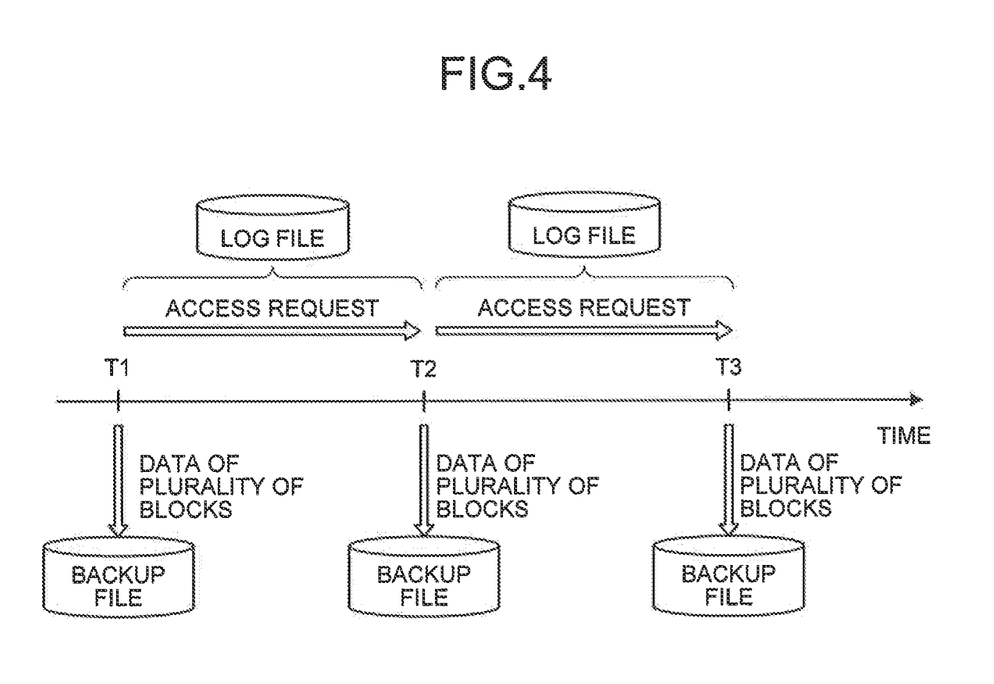
FIG. 4 is a diagram for explaining management processing of a plurality of blocks by a block management unit.

For example, the backup processing unit 26 generates a backup file corresponding to each of a plurality of backup times T1, T2, T3 and the like as illustrated in FIG. 4. Then, the backup processing unit 26 writes data of the plurality of blocks at each of the backup times T1, T2, T3, . . . to a corresponding backup file.

The log management unit 27 executes log recording operation for the plurality of blocks. Specifically, the log management unit 27 writes a log indicating an update history of data pieces to a log file. The log may be a history of received access requests. In the present example, the log management unit 27 writes the log to the log file in response to receiving an order from the access processing unit 23.

For example, the log management unit 27 generates the log file for each period between a backup time and a backup time as illustrated in FIG. 4. Then, the log management unit 27 writes the log in the period between a backup time and a backup time, to a corresponding log file.

The recovery unit 28 reads the backup file and the log file during recovery at start-up or after occurrence of a trouble, to recover data of each of the plurality of blocks. Specifically, the recovery unit 28 reads a backup file at a latest backup time in which data of all of the plurality of blocks have been written, among the backup files, to recover the data of all of the plurality of blocks. Subsequently, the recovery unit 28 sequentially re-executes logs from the backup time when data was able to be recovered to the time at shutdown or when a trouble occurs. Accordingly, the recovery unit 28 can recover the data of the plurality of blocks at shutdown or just prior to occurrence of a trouble.

Figure 5:
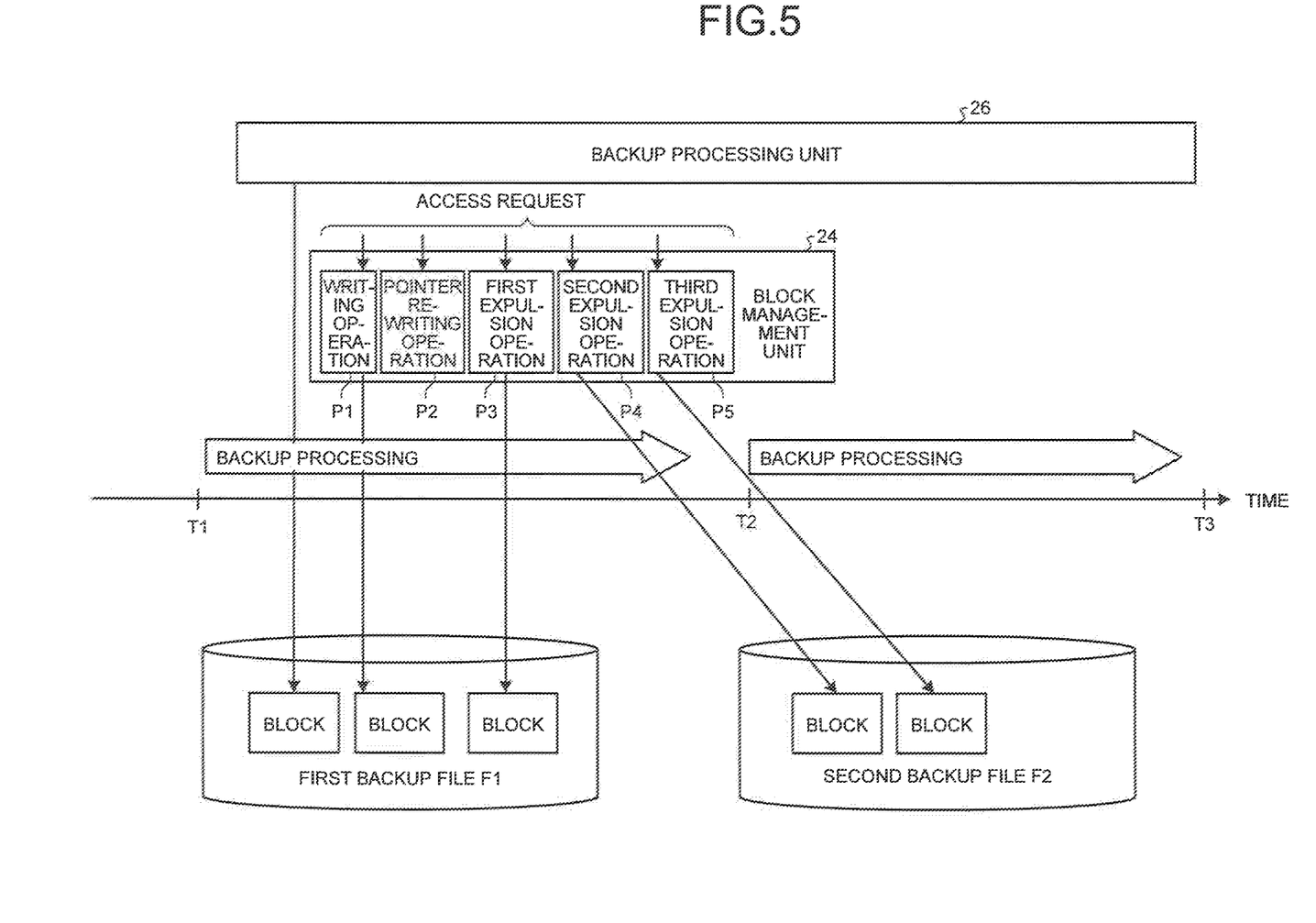
FIG. 5 is a diagram for explaining processing of writing a data image of a block to a backup file, by a block management unit and a backup processing unit.

FIG. 5 is a diagram for explaining processing of writing data of a block to a backup file, performed by the block management unit 24 and the backup processing unit 26.

An arbitrary backup time is designated as a first backup time T1; and a backup time following to the first backup time T1 is designated as a second backup time T2. Moreover, a backup time following to the second backup time T2 is designated as a third backup time T3.

Moreover, a backup file storing therein data of blocks at the first backup time T1 is designated as a first backup file F1. A backup file storing therein data of blocks at the second backup time T2 is designated as a second backup file F2.

In this case, the backup processing unit 26 writes, sequentially for each block, data of each of the plurality of blocks at the first backup time T1 to the first backup file F1 in the storage device 22 during a period between the first backup time T1 and the second backup time T2. In this case, the backup processing unit 26 determines whether or not each block is written to the first backup file F1, and writes the block to the storage device 22 on condition that the block is not yet written to the first backup file F1 by the block management unit 24. In other words, the backup processing unit 26 does not write data at the first backup time T1 of a block already written to the first backup file F1 by the block management unit 24, to the storage device 22.

Also, the backup processing unit 26 writes, sequentially for each block, data of each of the plurality of blocks at the second backup time T2, to the second backup file F2 in the storage device 22 during a period between the second backup time T2 and the third backup time T3, on condition that the data is not yet written to the second backup file F2 by the block management unit 24.

In this case, the backup processing unit 26 writes data of blocks to the storage device 22 in a background where an operations of the access processing unit 23 is not influenced. Herein, regarding an operation performed in the background, as an example, when the database includes a plurality of CPUs, an operation performed using some of the CPUs (Central Processing Units) not performing an operation corresponding to an access request. Furthermore, regarding an operation performed in the background, as an example, when the CPU performs operations in a time-shared manner, an operation performed in some of the period of time in which the CPU does not perform an operation corresponding to an access request.

The block management unit 24 executes a writing operation P1, a pointer re-writing operation P2, a first expulsion operation P3, a second expulsion operation P24 or a third expulsion operation P5 in response to receipt of an access request.

As the writing operation P1, the block management unit 24 executes an operation of writing pre-update data of a block targeted by an update request, to the first backup file F1. The block management unit 24 executes this writing operation P1 when the update request is made at and after the first backup time T1 and before the second backup time T2, and when the data of the block targeted by the update request is not written to the first backup file F1.

Accordingly, the block management unit 24 can execute update processing without waiting until backup is performed by the backup processing unit 26. Furthermore, since the backup processing unit 26 does not need to perform backup processing with respect to the block targeted by the update request, access to the storage device 22 can be reduced.

As the pointer re-writing operation P2, the block management unit 24 executes an operation of moving the recording-position pointer to a recording position on the first backup file F1, with respect to a first type block, which is written to the first backup file F1 and is not updated after the writing, among the plurality of blocks stored in the volatile memory 21. The block management unit 24 executes this pointer re-writing operation P2 when an access request is made at and after the first backup time T1 and before the second backup time T2, and when a block targeted by the access request is not stored in the volatile memory 21 and the volatile memory 21 has a free space not larger than a predetermined amount. Furthermore, the block management unit 24 may execute the pointer re-writing operation P2 for the first type block on condition that a reference request is not made for a certain period of time.

Accordingly, the block management unit 24 can generate a free space in the volatile memory 21 without making access to the storage device 22 when the block targeted by the access request is not stored in the volatile memory 21. Furthermore, by further defining as a condition that a reference request is not made for a certain period of time, the block management unit 24 can preferentially delete a block that is unlikely to be immediately targeted by an access request, from the volatile memory 21.

Furthermore, as the first expulsion operation P3, the block management unit 24 executes an operation of writing data to the first backup file F1 and moving the recording-position pointer to a recording position on the first backup file F1, with respect to a second type block, which is not written to the first backup file F1, among the plurality of blocks stored in the volatile memory 21. The block management unit 24 executes this first expulsion operation P3 when the first type block cannot be detected. Furthermore, the block management unit 24 may execute this first expulsion operation P3 for the second type block on condition that a reference request is not made for a certain time.

Accordingly, the block management unit 24, instead of the backup processing unit 26, can write a block to be later written to the storage device 22 by the backup processing unit 26, to the storage device 22. As a result, the block management unit 24 can reduce overlapped access to the storage device 22.

Furthermore, as the second expulsion operation P4, the block management unit 24 executes an operation of writing data to the second backup file F2 and moving the recording-position pointer to a recording position on the second backup file F2, with respect to a third type block, which is written to the first backup file F11 and is updated after the writing, among the plurality of blocks stored in the volatile memory 21. The block management unit 24 executes this second expulsion operation P4 when the first type block and the second type block cannot be detected. Furthermore, the block management unit 24 may execute the second expulsion operation P4 for the third type block on condition that a reference request is not made for a certain time.

Accordingly, the block management unit 24, instead of the backup processing unit 26, can previously write a block possibly written to the second backup file F2 by the backup processing unit 26, to the storage device 22. As a result, the block management unit 24 can reduce overlapped access to the storage device 22.

Furthermore, as the third expulsion operation P5, the block management unit 24 executes an operation of writing data of a fourth block, which is any one among the plurality of blocks stored in the volatile memory 21, to the second backup file F2, and moving the recording-position pointer of the fourth block to a recording position on the second backup file F2. The block management unit 24 executes this third expulsion operation P5 when all of the first type block, the second type block and the third type block cannot be detected. In this case, the block management unit 24 executes the third expulsion operation P5 even for a block targeted by a reference request for a certain period of time.

Here, as the third expulsion operation P5, the block management unit 24 may write the fourth block to another position on the storage device 22, instead of writing to the second backup file F2. For example, as the third expulsion operation P5, the block management unit 24 may write the fourth block to a virtual memory area virtually operating as the volatile memory 21 on the storage device 22. In this case, the block management unit 24 does not need to move the recording-position pointer of the fourth block from on the volatile memory 21.

Figure 6:
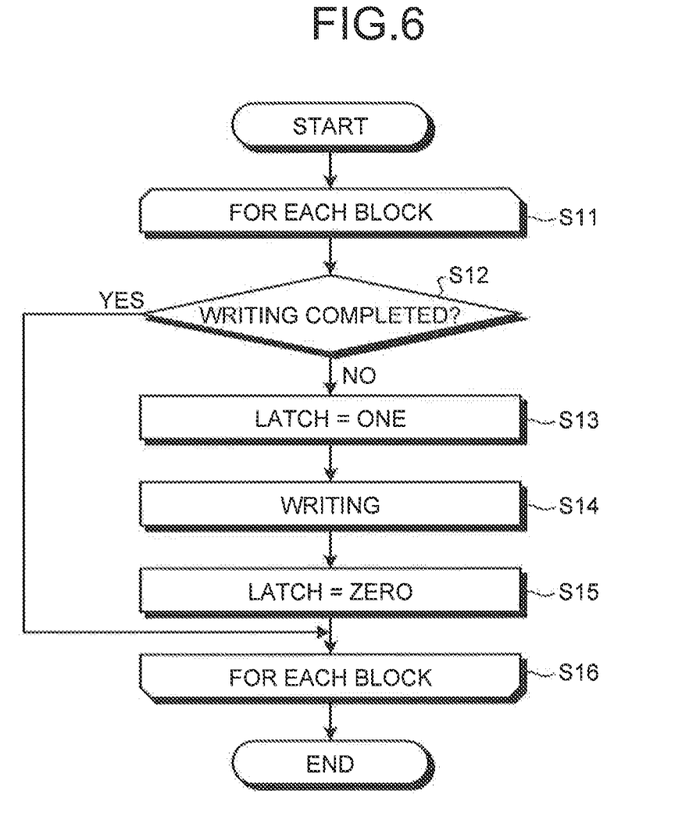
FIG. 6 is a diagram illustrating an operation flow of a backup processing unit.

FIG. 6 is a diagram illustrating an operation flow of the backup processing unit 26. The backup processing unit 26 executes operations from step S11 through step S16 described below, in a background, at each predetermined backup time.

First, between step S11 and step S16, the backup processing unit 26 executes a loop operation for each block. Within the loop operation, first, in step S12, the backup processing unit 26 refers to the final backup time in the attribute information for a target block to determine whether or not the target block has been written to a corresponding backup file by the block management unit 24. When the target block has been written to the corresponding backup file (Yes in step S12), the backup processing unit 26 proceeds to the operation at step S16.

When the target block has not been written to the corresponding backup file (No in step S12), in step S13, the backup processing unit 26 rewrites the latch flag in the attribute information for the target block to "1". Subsequently, in step S14, the backup processing unit 26 writes data of the target block to a corresponding backup file on the storage device 22 in a background.

When the writing is completed in step S14, in step S15, the backup processing unit 26 rewrites the latch flag in the attribute information of the target block to "0". Then, the backup processing unit 26 proceeds to the operation at step S16.

In step S16, when the operations has not been executed for all of the plurality of blocks, the backup processing unit 26 returns the operation at step S11. When the operations have been executed for all of the plurality of blocks, the backup processing unit 26 terminates the operations of the present flow.

In this way, the backup processing unit 26 can write, sequentially for each block, data of each of the plurality of blocks at the backup time to the corresponding backup file in the storage device 22. Furthermore, the backup processing unit 26 does not need to perform writing for a block already written to the backup file by the block management unit 24, and thus access to the storage device 22 can be reduced.

Figure 7:
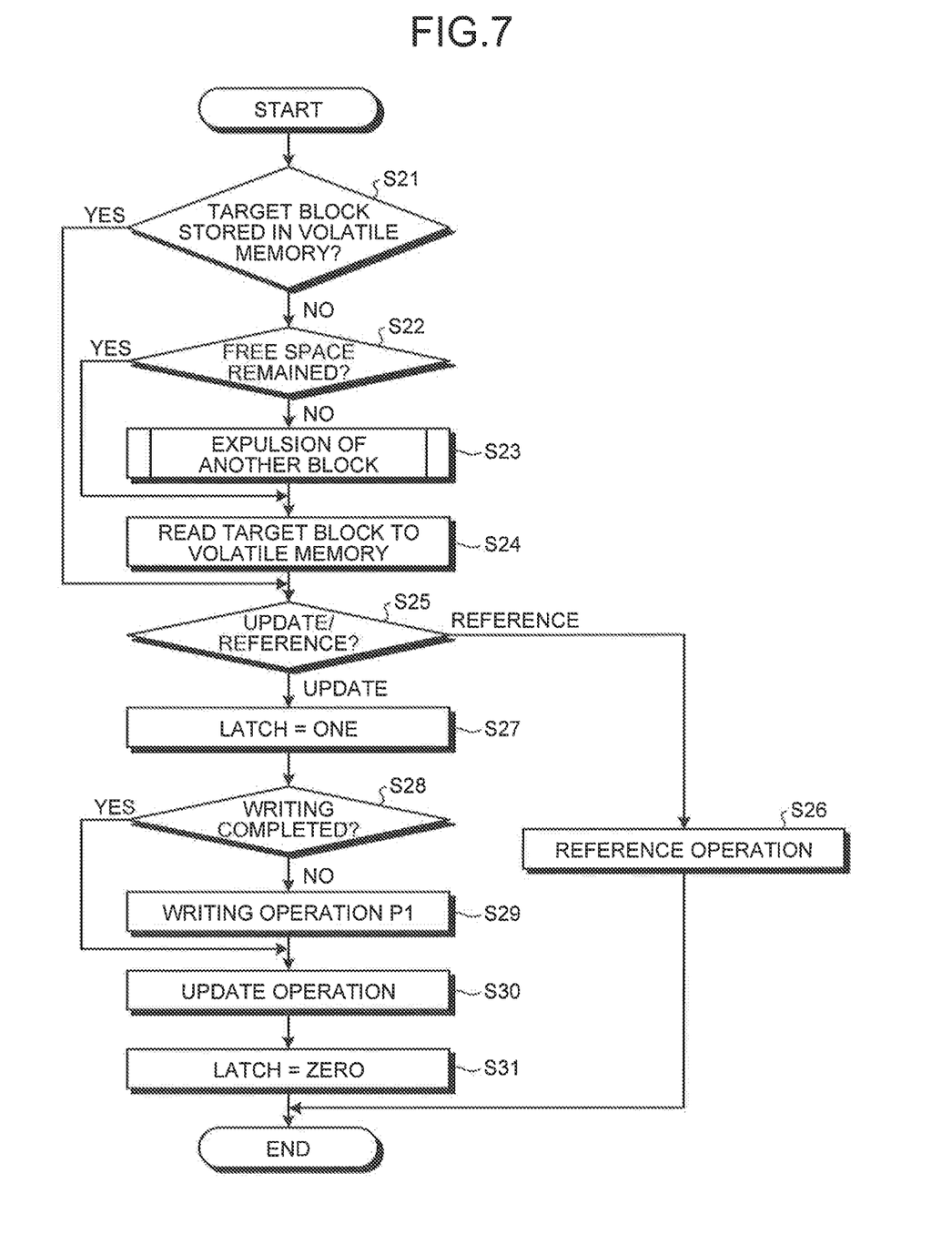
FIG. 7 is a diagram illustrating an operation flow of the block management unit when an access request is received.

FIG. 7 is a diagram illustrating an operation flow of the block management unit 24 when an access request is received. The block management unit 24 executes the operations from step S21 to step S31 described below each time the access processing unit 23 receives an access request from outside.

First, in step S21, the block management unit 24 determines whether or not a block targeted by an access request is stored in the volatile memory 21. When stored in the volatile memory 21 (Yes in step S21), the block management unit 24 proceeds to the operation at step S25. When not stored in the volatile memory 21 (No in step S21), the block management unit 24 proceeds to the operation at step S22.

In step S22, the block management unit 24 determines whether or not the volatile memory 21 has a free space smaller than a predetermined space. More specifically, the block management unit 24 determines whether or not the volatile memory 21 has a free space allowing a new block to be additionally stored. When having such a free space (Yes in step S22), the block management unit 24 proceeds to the operation at step S24.

When not having such a free space (No in step S22), in step S23, the block management unit 24 executes an operation of evicting another block in the volatile memory 21 to the storage device 22. The expulsion operation at step S23 will be further described in detail in FIG. 8. When the operation at step S23 is completed, the block management unit 24 proceed to the operation at step S24.

In step S24, the block management unit 24 allows the block targeted by the access request to be read from the storage device 22 to the volatile memory 21. Accordingly, the block management unit 24 allows the access processing unit 23 to execute an operation corresponding to the access request.

Subsequently, in step S25, the block management unit 24 determines whether the access request is reference processing (that is, processing not involving addition and modification of data) or update processing (that is, processing involving addition and modification of data).

When the access request is a reference processing (Reference in step S25), the block management unit 24 proceeds to the operation at step S26. In step S26, the block management unit 24 allows the access processing unit 23 to execute reference processing corresponding to the access request, and rewrites the final reference time in the attribute information for the target block. Then, when the operation at step S26 is completed, the block management unit 24 terminates the present flow.

When the access request is update processing (Update in step S25), in step S27, the block management unit 24 rewrites the latch flag in the attribute information of the target block to "1". Subsequently, in step S28, the block management unit 24 refers to the final backup time in the attribute information of the target block, to determine whether or not the target block has been written to a backup file at a latest backup time before the current time.

When the target block has been written to the corresponding backup file (Yes in step S28), the block management unit 24 proceeds to the operation at step S30. When the target block has not been written to the corresponding backup file (No in step S28), the block management unit 24 proceeds to the operation at step S29.

In step S29, the block management unit 24 executes the writing operation P1. That is, the block management unit 24 executes an operation of writing data of the target block to a backup file, on the storage device 22, at a latest backup time before the current time. Accordingly, when data of the block targeted by the update request has not been yet written to the backup file, the block management unit 24 can write data of the pre-update block to the backup file.

Furthermore, when the writing is completed, the block management unit 24 rewrites the final backup time in the attribute information of the target block. When the processing of step S29 is completed, the block management unit 24 proceeds to the operation at step S30.

In step S30, the block management unit 24 allows the access processing unit 23 to execute update processing corresponding to the access request. At the same time, the block management unit 24 rewrites the final-reference time in the attribute information of the target block. Additionally, the block management unit 24 rewrites the dirty flag indicating that update has been performed after writing to the backup file, to "1".

Subsequently, in step S31, the block management unit 24 rewrites the latch flag in the attribute information of the target block to "0". Then, when the operation at step S31 is completed, the block management unit 24 terminates the present flow.

As described above, when data of the block targeted by the update request has not been written to the backup file, the block management unit 24 can write the pre-update data of the block targeted by the update request to the backup file, and then perform update.

Accordingly, the block management unit 24 can execute update processing without waiting until backup is performed. In addition, the block management unit 24 inhibits the backup processing unit 26 from executing backup processing for the block targeted by the update request. Therefore, access to the storage device 22 can be reduced.

Figure 8:
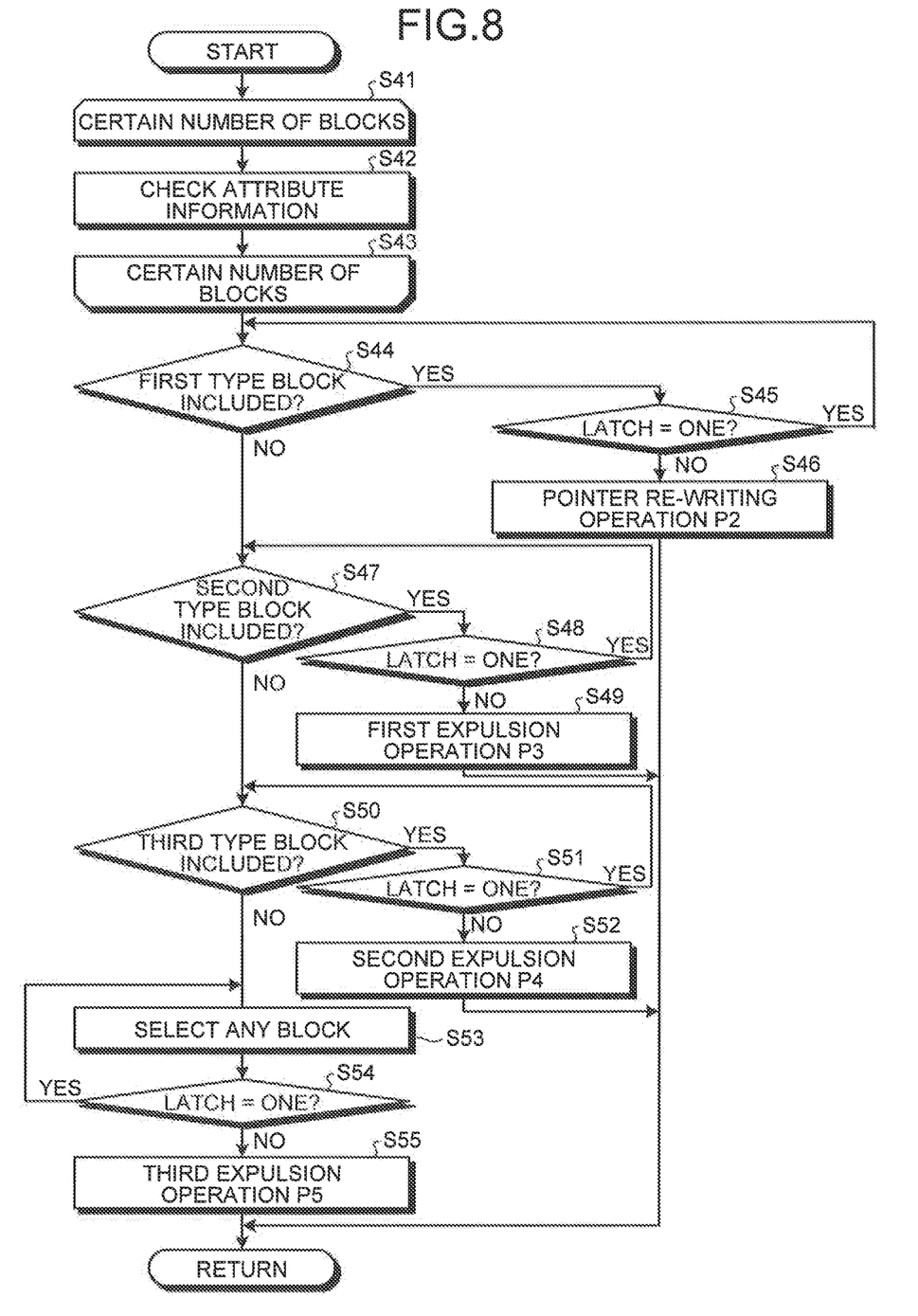
FIG. 8 is a diagram illustrating a processing flow of step S23 in FIG. 7.

FIG. 8 is a diagram illustrating an operation flow of step S23 in FIG. 7. In step S23 of FIG. 7, the block management unit 24 executes the operation from step S41 to step S55 described below.

The block management unit 24 executes, first, loop operation from step S41 to step S43 for each of a certain number of blocks. Here, a certain number of blocks means all or a part of the plurality of blocks stored in the volatile memory 21.

Figure 9:
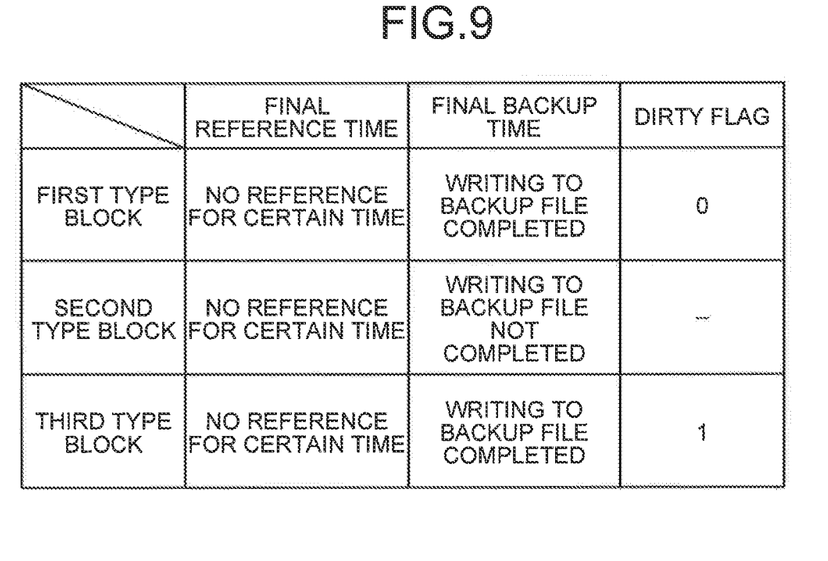
FIG. 9 is a diagram illustrating attribute information of first to third type blocks.

In step S42 within the loop operation, the block management unit 24 checks the attribute information of a target block. More specifically, the block management unit 24 refers to, as illustrated in FIG. 9, the final reference time, the final backup time and the dirty flag, to detect whether the first type, second type and third type blocks exist.

The first type block is a block for which a reference request (including an update request) is not made for a certain period of time right before the current time, from which writing to a backup file at a backup time immediately before the current time is completed; and for which the dirty flag is set to "0". The second type block is a block for which a reference request (including an update request) is not made for a certain period of time right before the current time; and from which writing to a backup file at a backup time immediately before the current time is not completed. The third type block is a block for which a reference request (including an update request) is not made for a certain period of time right before the current time; from which writing to a backup file at a backup time immediately before the current time is completed; and for which the dirty flag is set to "1".

Then, after checking the attribute information of all of the certain number of blocks, the block management unit 24 proceeds to the operation at step S44.

In step S44, the block management unit 24 determines whether or not the first type block is included in the certain blocks. When the first type block is included (Yes in step S44), in step S45, the block management unit 24 determines whether or not the latch flag is "1". When the latch flag is "1" (Yes in step S45), the block management unit 24 returns the operation at step S44, and determines again whether or not the first type block is included.

When the first type block is included, and the latch flag of the block is not "1" (No in step S45), the block management unit 24 executes the pointer re-writing operation P2. That is, the block management unit 24 moves the recording-position pointer in the attribute information of the block, from on the volatile memory 21 to a recording position in the backup file on the storage device 22.

By executing such pointer re-writing operation P2, the block management unit 24 executes only an operation of bringing the block already written to the backup file into a state of being stored in the storage device 22. Therefore, a free space can be generated in the volatile memory 21 with no access to the storage device 22.

When the first type block is not included in the certain number of blocks, or when the latch flag of the first type block is "1" (No in step S44), the block management unit 24 proceeds to the operation at step S47.

In step S47, the block management unit 24 determines whether or not the second type block is included in the certain blocks. When the second type block is included (Yes in step S47), in step S48, the block management unit 24 determines whether or not the latch flag is "1". When the latch flag is "1" (Yes in step S48), the block management unit 24 returns the operation at step S47, and determines again whether or not the second type block is included.

When the second type block is included, and the latch flag of the block is not "1" (No in step S48), the block management unit 24 executes the first expulsion operation P3 in step S49. That is, the block management unit 24 writes data of the block to a backup file on the storage device 22 at a backup time immediately before the current time. At the same time, the block management unit 24 moves the recording-position pointer in the attribute information of the block from on the volatile memory 21 to a recording position in the backup file on the storage device 22.

By executing such first expulsion operation P3, when data has not been yet written to the backup file, the block management unit 24, instead of the backup processing unit 26, can write the data of the block to the backup file. Accordingly, the block management unit 24 can reduce access to the storage device 22.

When the second type block is not included in the certain number of blocks, or when the latch flag of the second type block is "1" (No in step S47), the block management unit 24 proceeds to the operation at step S50.

In step S50, the block management unit 24 determines whether or not the third type block is included in the certain blocks. When the third type block is included (Yes in step S50), in step S51, the block management unit 24 determines whether or not the latch flag is "1". When the latch flag is "1" (Yes in step S51), the block management unit 24 returns the operation at step S50, and determines again whether or not the third type block is included.

When the third type block is included, and the latch flag of the block is not "1" (No in step S51), the block management unit 24 executes the second expulsion operation P4 in step S52. That is, the block management unit 24 writes data of the block to a backup file at a latest backup time after the current time. At the same time, the block management unit 24 moves the recording-position pointer in the attribute information of the block, from on the volatile memory 21 to a recording position in the backup file on the storage device 22.

Thus, the block management unit 24 can previously write data to a backup file to which the backup processing unit 26 is to write the data in the future, for the block containing data already written to the backup file before the current time. Accordingly, since the backup processing unit 26 will not need to execute backup processing for the target block in the future, the block management unit 24 can reduce access to the storage device 22.

When the third type block is not included in the certain number of blocks, or when the latch flag of the third type block is "1" (No in step S50), the block management unit 24 proceeds to the operation at step S53.

In step S53, the block management unit 24 selects any one block from the certain blocks. Here, the block management unit 24 selects a block that is not any one of the first to third type blocks (fourth type). That is, the block management unit 24 selects a block that has been targeted by a reference request (including an update request) for a certain period of time right before the current time.

After any block is selected, in step S54, the block management unit 24 determines whether or not the latch flag is "1". When the latch flag is "1" (Yes in step S54), the block management unit 24 returns the operation at Step S53, and selects again another block.

When a block wherein the latch flag is not "1" is selected (No in step S54), in step S55, the block management unit 24 executes the third expulsion operation P5. That is, the block management unit 24 writes data to a backup file at a latest backup time after the current time. At the same time, the block management unit 24 moves the recording-position pointer in the attribute information of the block, to a recording position in the backup file on the storage device 22.

Meanwhile, in step S55, the block management unit 24 may write data of the block to an area that is not a backup file on the storage device 22. For example, the block management unit 24 may write the data of the block to a virtual memory area on the storage device 22. In this case, the block management unit 24 does not need to move the recording-position pointer of the fourth block from on the volatile memory 21. By writing the data to the virtual memory area on the storage device 22, the block management unit 24 can more quickly access the storage device 22 than writing to the backup file, when an access request is made for the block again.

Then, when the operation in step S46, step S49, step S52 or step S55 is completed, the block management unit 24 returns the operation of the flow in FIG. 7.

As described above, the database device 10 according to the present embodiment prevents redundancy between the operation of evicting a part of the plurality of blocks that cannot be stored in the volatile memory 21 to the storage device 22 and the operation of performing backup of data of the plurality of blocks to the storage device 22 by the backup processing unit 26. Accordingly, the database device 10 can reduce access to the storage device 22, to thereby increase a response rate.

Furthermore, a program to be executed in the database device 10 according to the present embodiment is provided by being recorded as an installable-format or executable-format file in a computer-readable recording medium such as a CD-ROM, a flexible disk (FD), a CD-R, and a Digital Versatile Disk (DVD).

Furthermore, the program to be executed in the database device 10 according to the present embodiment may be provided by being stored on a computer connected to a network such as the Internet and being downloaded via a network. Furthermore, the program to be executed in the database device 10 according to the present embodiment may be structured so as to be provided or distributed via a network such as the Internet.

Furthermore, the program of the database device 10 according to the present embodiment may be structured so as to be provided by being previously incorporated in a ROM or the like.

The program to be executed in the database device 10 according to the present embodiment has a module structure containing the above-described units (the access processing unit 23, the block management unit 24, the backup processing unit 26, the log management unit 27 and the recovery unit 28). As actual hardware, a CPU (processor) reads the program from the above-described recording medium and executes the program, so that each unit described above is loaded on a main storage unit. Accordingly, the access processing unit 23, the block management unit 24, the backup processing unit 26, the log management unit 27 and the recovery unit 28 are generated on the main storage unit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An in-memory database device storing therein a plurality of blocks obtained by dividing data pieces, the device comprising:
    a volatile first storing unit;
    a non-volatile second storing unit;
    an access processing unit configured to execute an operation corresponding to an access request for each of the plurality of blocks obtained by dividing data pieces;
    a backup processing unit configured to write data of each of the plurality of blocks at a backup time to a backup file in the second storing unit for backing up; and
    a block management unit configured to manage a recording position of each block of the plurality of blocks and to manage a recording-position pointer indicative of the recording position in the first storing unit or the second storing unit in which data is recorded for each of the plurality of blocks, wherein
    the backup processing unit:
        writes, sequentially for each block of the plurality of blocks, data of each of the plurality of blocks at a predetermined first backup time to a first backup file in the second storing unit, on condition that the data is not yet written to the first backup file; and
        writes, sequentially for each block of the plurality of blocks, data of each of the plurality of blocks at a second backup time after a predetermined time from the first backup time to a second backup file in the second storing unit, on condition that the data is not yet written to the second backup file, and
    the block management unit, when an access request is made for a targeted block not stored in the first storing unit, and is made not before the first backup time and made before the second backup time, and when the first storing unit has a free space not larger than a predetermined amount, evicts another block in the first storing unit to the second storing unit by:
        detecting a first block, data of which is stored in the first storing unit, is already written to the first backup file in the second storing unit, and is not updated after the data is written to the first backup file;
        when the first block is detected, changing a recording-position pointer of the first block from the recording position on the first storing unit to a recording position on the first backup file in the second storing unit instead of writing data of any block stored in the first storing unit to the second storing unit;
        when the first block is undetectable, detecting a second block, data of which is stored in the first storing unit and is not written to the first backup file in the second storing unit;

when the second block is detected, writing data of the second block to the first backup file in the second storing unit and changing the recording-position pointer of the second block from the recording position on the first storing unit to a recording position on the first backup file in the second storing unit;

when the first block and the second block are undetectable, detecting a third block, data of which is stored in the first storing unit and is updated after the data is written to the first backup file;

when the third block is detected, writing data of the third block to the second backup file in the second storing unit and changing the recording-position pointer of the third block from the recording position on the first storing unit to a recording position on the second backup file in the second storing unit;

when the first block, the second block, and the third block are undetectable, writing data of any block stored in the first storing unit to the second storing unit, and changing a recording-position pointer of the block in which the data is written to the first storing unit, to a recording position in the second storing unit.

2. The device according to claim 1, wherein
the block management unit further executes an operation with respect to the first block, the second block or the third block, on condition that a reference request is not made for a certain period of time.

3. The device according to claim 1, wherein
the backup processing unit writes data of each of the plurality of blocks to the second storing unit in a background where an operation of the access processing unit is not influenced.

4. The device according to claim 1, wherein
when the access request is a reference request, the block management unit reads data of the block targeted by the access request from the second storing unit, writes the data of the block targeted by the access request to the first storing unit, and changes a recording-position pointer of the block targeted by the access request to a recording position in the first storing unit.

5. The device according to claim 4, wherein
when the access request is an update request made before the second backup time, but not before the first backup time, and data of the block targeted by the update request is not yet written to the first backup file, writes pre-update data of the block targeted by the update request to the first backup file in the second storing unit.

6. A computer program product comprising a non-transitory computer-readable medium containing a computer program for causing a computer to function as an in-memory database device storing therein a plurality of blocks obtained by dividing data pieces and comprising a volatile first storing unit and a non-volatile second storing unit, the program executing:

an access processing step of executing an operation corresponding to an access request for each of the plurality of blocks;

a backup processing step of writing data of each of the plurality of blocks at a backup time to a backup file in the second storing unit for backing up; and a block management step of managing a recording position of each block of the plurality of blocks and managing a recording-position pointer indicative of the recording position in the first storing unit or the second storing unit in which data is recorded for each of the plurality of blocks, the backup processing step includes:
writing, sequentially for each block of the plurality of blocks, data of each of the plurality of blocks at a predetermined first backup time to a first backup file in the second storing unit, on condition that the data is not yet written to the first backup file, and writing, sequentially for each block of the plurality of blocks, data of each of the plurality of blocks at a second backup time after a predetermined time from the first backup time to a second backup file in the second storing unit, on condition that the data is not yet written to the second backup file, and the block management step includes, when an access request is made for a targeted block not stored in the first storing unit, and is made not before the first backup time and made before the second backup time, and when the first storing unit has a free space not larger than a predetermined amount, evicting another block in the first storing unit to the second storing unit by:

detecting a first block, data of which is stored in the first storing unit, is already written to the first backup file in the second storing unit, and is not updated after the data is written to the first backup file;

when the first block is detected, changing a recording-position pointer of the first block from the recording position on the first storing unit to a recording position on the first backup file in the second storing unit instead of writing data of any block stored in the first storing unit to the second storing unit;

when the first block is undetectable, detecting a second block, data of which is stored in the first storing unit and is not written to the first backup file in the second storing unit;

when the second block is detected, writing data of the second block to the first backup file in the second storing unit and changing the recording-position pointer of the second block from the recording position on the first storing unit to a recording position on the first backup file in the second storing unit;

when the first block and the second block are undetectable, detecting a third block, data of which is stored in the first storing unit and is updated after the data is written to the first backup file;

when the third block is detected, writing data of the third block to the second backup file in the second storing unit and changing the recording-position pointer of the third block from the recording position on the first storing unit to a recording position on the second backup file in the second storing unit;

when the first block, the second block, and the third block are undetectable, writing data of any block stored in the first storing unit to the second storing unit, and changing a recording-position pointer of the block in which the data is written to the first storing unit, to a recording position in the second storing unit.

7. The computer program product according to claim 6, wherein
when the access request is a reference request, reads data of the block targeted by the access request from the second storing unit, writes the data of the block targeted by the access request to the first storing unit, and changes a recording-position pointer of the block targeted by the access request to a recording position in the first storing unit.

8. The computer program product according to claim 6, wherein
when the access request is an update request made before the second backup time, but not before the first backup time, and data of the block targeted by the update request is not yet written to the first backup file, writes pre-update data of the block targeted by the update request to the first backup file in the second storing unit.

9. A data processing method performed in an in-memory database device storing therein a plurality of blocks obtained by dividing data pieces and comprising a volatile first storing unit and a non-volatile second storing unit, the method comprising:
an access processing step of executing an operation corresponding to an access request for each of the plurality of blocks;
a backup processing step of writing data of each of the plurality of blocks at a backup time to a backup file in the second storing unit for backing up; and
a block management step of managing a recording position of each block of the plurality of blocks and managing a recording-position pointer indicative of the recording position in the first storing unit or the second storing unit in which data is recorded for each of the plurality of blocks, wherein
the backup processing step includes:
writing, sequentially for each block of the plurality of blocks, data of each of the plurality of blocks at a predetermined first backup time to a first backup file in the second storing unit, on condition that the data is not yet written to the first backup file, and
writing, sequentially for each block of the plurality of blocks, data of each of the plurality of blocks at a second backup time after a predetermined time from the first backup time to a second backup file in the second storing unit, on condition that the data is not yet written to the second backup file, and
the block management step includes, when an access request made for a targeted block not stored in the first storing unit, and is made not before the first backup time and made before the second backup time, and when the first storing unit has a free space not larger than a predetermined amount, evicting another block in the first storing unit to the second storing unit by:
detecting a first block, data of which is stored in the first storing unit, is already written to the first backup file in the second storing unit, and is not updated after the data is written to the first backup file;
when the first block is detected, changing a recording-position pointer of the first block from the recording position on the first storing unit to a recording position on the first backup file in the second storing unit instead of writing data of any block stored in the first storing unit to the second storing unit;
when the first block is undetectable, detecting a second block, data of which is stored in the first storing unit and is not written to the first backup file in the second storing unit;
when the second block is detected, writing data of the second block to the first backup file in the second storing unit and changing the recording-position pointer of the second block from the recording position on the first storing unit to a recording position on the first backup file in the second storing unit;
when the first block and the second block are undetectable, detecting a third block, data of which is stored in the first storing unit and is updated after the data is written to the first backup file;
when the third block is detected, writing data of the third block to the second backup file in the second storing unit and changing the recording-position pointer of the third block from the recording position on the first storing unit to a recording position on the second backup file in the second storing unit;
when the first block, the second block, and the third block are undetectable, writing data of any block stored in the first storing unit to the second storing unit, and changing a recording-position pointer of the block in which the data is written to the first storing unit, to a recording position in the second storing unit.

10. The method according to claim 9, wherein
when the access request is a reference request, reads data of the block targeted by the access request from the second storing unit, writes the data of the block targeted by the access request to the first storing unit, and changes a recording-position pointer of the block targeted by the access request to a recording position in the first storing unit.

11. The method according to claim 9, wherein
when the access request is an update request made before the second backup time, but not before the first backup time, and data of the block targeted by the update request is not yet written to the first backup file, writes pre-update data of the block targeted by the update request to the first backup file in the second storing unit.

* * * * *